US009509150B2

(12) United States Patent
Liu et al.

(10) Patent No.: US 9,509,150 B2
(45) Date of Patent: Nov. 29, 2016

(54) CHARGING CIRCUIT AND CONTROL METHOD THEREFOR

(75) Inventors: Jiajun Liu, Shenzhen (CN); Jihong Wang, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 197 days.

(21) Appl. No.: 14/402,848

(22) PCT Filed: Aug. 22, 2012

(86) PCT No.: PCT/CN2012/080455
§ 371 (c)(1),
(2), (4) Date: Nov. 21, 2014

(87) PCT Pub. No.: WO2013/174081
PCT Pub. Date: Nov. 28, 2013

(65) Prior Publication Data
US 2015/0326036 A1    Nov. 12, 2015

(30) Foreign Application Priority Data

May 23, 2012   (CN) .......................... 2012 1 0161580

(51) Int. Cl.
*H02J 7/00*          (2006.01)
(52) U.S. Cl.
CPC .............. *H02J 7/0003* (2013.01); *H02J 7/007* (2013.01); *H02J 7/008* (2013.01); *H02J 7/0052* (2013.01); *H02J 2007/0062* (2013.01)
(58) Field of Classification Search
CPC ...... H02J 7/0003; H02J 7/007; H02J 7/0052; H02J 2007/0062; H02J 7/008
USPC ....................................... 320/162
See application file for complete search history.

(56) References Cited

U.S. PATENT DOCUMENTS 5,204,611 A * 4/1993 Nor et al. ............. H02J 7/0086
                                                      320/145
5,602,460 A * 2/1997 Fernandez et al. ... H02J 7/0031
                                                      320/152

(Continued)

FOREIGN PATENT DOCUMENTS

CN          1681182 A      10/2005
CN        201063445 Y       5/2008

(Continued)

OTHER PUBLICATIONS

Supplementary European Search Report in European application No. 12877218.3, mailed on Apr. 30, 2015.

(Continued)

*Primary Examiner* — Sun Lin
(74) *Attorney, Agent, or Firm* — Oppedahl Patent Law Firm LLC

(57) ABSTRACT

A charging circuit and a control method for charging different brands of mobile devices are disclosed. The charging circuit comprises: a universal interface connected to a mobile device to be charged; a charging adaptation unit comprising at least two types of charging circuitries, wherein the charging adaptation unit is connected to the universal interface and configured to provide a corresponding charging circuitry for the mobile device; a voltage conversion unit connected to a charging power source and configured to adjust an output voltage of the charging power source to a charging voltage for the mobile device; and a current detection unit connected between the voltage conversion unit and the charging adaptation unit and configured to detect a charging current, wherein the charging current is configured to determine the corresponding charging circuitry for the mobile device. The charging circuit and the control method thereof can charge different brands of mobile devices by means of a single universal interface, and can also charge a mobile device by means of another mobile device, which makes the use of mobile devices more convenient.

15 Claims, 3 Drawing Sheets

(56) References Cited

U.S. PATENT DOCUMENTS

| | | | |
|---|---|---|---|
| 6,707,725 B2* | 3/2004 | Morikawa | G11C 5/147 365/189.09 |
| 6,757,783 B2* | 6/2004 | Koh | G06K 19/07732 710/105 |
| 8,362,748 B2* | 1/2013 | Miyanaga et al. | G01R 19/16538 320/132 |
| 2007/0075680 A1 | 4/2007 | Chung | |
| 2008/0174263 A1 | 7/2008 | Ghode | |
| 2009/0085523 A1 | 4/2009 | Kim | |
| 2010/0013442 A1* | 1/2010 | Yamazaki et al. | H01M 10/44 320/162 |
| 2011/0025255 A1* | 2/2011 | Aradachi et al. | H01M 10/44 320/101 |
| 2012/0043927 A1 | 2/2012 | Park | |
| 2013/0026983 A1* | 1/2013 | Yamamoto et al. | H02J 7/0055 320/108 |

FOREIGN PATENT DOCUMENTS

| | | |
|---|---|---|
| CN | 101771178 A | 7/2010 |
| CN | 201717653 U | 1/2011 |
| CN | 201887500 U | 6/2011 |
| CN | 102185168 A | 9/2011 |
| CN | 102231543 A | 11/2011 |
| CN | 102280670 A | 12/2011 |
| EP | 2043223 A2 | 4/2009 |
| EP | 2424073 A2 | 2/2012 |

OTHER PUBLICATIONS

International Search Report in international application No. PCT/CN2012/080455, mailed on Feb. 28, 2013.

English Translation of the Written Opinion of the International Search Authority in international application No. PCT/CN2012/080455, mailed on Feb. 28, 2013.

* cited by examiner

CHARGING CIRCUIT AND CONTROL METHOD THEREFOR

TECHNICAL FIELD

The present disclosure relates to the field of mobile devices, and more particularly to a charging circuit and a control method thereof.

BACKGROUND

UFI (e.g., mobile wireless router) products and PAD products have become more and more popular among consumers, while the battery capacity of these two kinds of products is also increasing and the mainstream battery capacity is all above 4500 mAh in the future. There may be also a great deal of electrical redundancy in the case of satisfying electricity consumed by the products themselves, and consumers will expect to charge other mobile devices. For example, a smart phone, limited by size to usually have a battery capacity below 2000 mAh, will run out of power quickly, and the smart phone can be charged through a UFI or PAD product and when there is no commercial power, e.g. in the wild, for emergencies.

Currently, charging detection methods for different brands of mobile terminals on the market are slightly different. On some mobile terminals, different voltages are applied on Data Positive (DP) and Data Minus (DM), and charging will be displayed only when these two voltages are detected during a charging process. However, such design will cause a charging failure or even damage to other mobile terminals.

Therefore, different chargers will be applied to charging different brands of mobile terminals in the prior art, which will make charging troublesome for users. However, there is no ideal solution for this problem currently.

SUMMARY

The present disclosure discloses a charging circuit and a control method thereof to solve the problem that different brands of mobile devices cannot use the same charger in the prior art.

The technical solution of the present disclosure is realized by the following way:

a charging circuit, including:

a universal interface connected to a mobile device to be charged;

a charging adaptation unit including at least two types of charging circuits, wherein the charging adaptation unit is connected to the universal interface and configured to provide a corresponding charging circuit for the mobile device;

a voltage conversion unit connected to a charging power source and configured to adjust the output voltage of the charging power source to a charging voltage for the mobile device;

a current detection unit connected between the voltage conversion unit and the charging adaptation unit and configured to detect a charging current, wherein the charging current is configured to determine the charging circuit corresponding to the mobile device, wherein the at least two types of charging circuits may include a first circuit and a second circuit, wherein the first circuit is a charging circuit having the same voltage on two data pins, and the second circuit is a charging circuit having different voltages on two data pins, wherein the charging circuit may further include:

a control unit, connected to the current detection unit, the charging adaptation unit and the voltage conversion unit respectively and configured to determine, according to a current value detected by the current detection unit, whether charging of the mobile device is completed, and control the charging adaptation unit and the voltage conversion unit to turn on and turn off, wherein the control unit may include:

a power source management chip, connected to the charging power source and the current detection unit respectively and configured to acquire the current value and acquire a power supply voltage provided by the charging power source for the control unit;

a main control chip, connected to the power source management chip and the voltage conversion unit and configured to send a control instruction according to the current value and control the voltage conversion unit to turn on and turn off;

a switch control unit, connected to the main control chip and the charging adaptation unit respectively and configured to send a control instruction according to the current value and control the charging adaptation unit to turn on and turn off, wherein the universal interface is a Universal Serial Bus (USB) interface.

A control method of a charging circuit, including:

a charging adaptation unit uses a current first circuit as a charging circuit for a mobile device by default;

the charging adaptation unit determines whether a first current value corresponding to the charging voltage of the first circuit is larger than a first threshold and obtains a first determination result;

the charging adaptation unit controls the first circuit to charge the mobile device when the first determination result is that the first current value is larger than the first threshold, wherein after the step of controlling the first circuit to charge the mobile device, the method may further include:

determining whether a second current value corresponding to the charging voltage of the first circuit is larger than a second threshold and obtaining a second determination result;

controlling the first circuit to continue to charge the mobile device when the determination result is that the second current value is larger than the second threshold, and controlling the first circuit to stop charging the mobile device when the determination result is that the second current value is smaller than the second threshold, wherein the voltages on two data pins of the first circuit are the same.

wherein when the first determination result is that the first current value is smaller than or equal to the first threshold, the method further includes:

determining a second circuit to be a charging circuit according to the first current value;

controlling the second circuit to charge the mobile device, wherein the voltages on two data pins of the second circuit are different.

By applying the technical solution of the present disclosure, all mobile devices can be charged by using the same interface, and the charging function can be turned off after charging.

DETAILED DESCRIPTION

The embodiments of the present disclosure will be described in details below in combination with the accompanying drawings. However, the present disclosure may be implemented by various different methods limited and covered by the claims.

Figure 1:
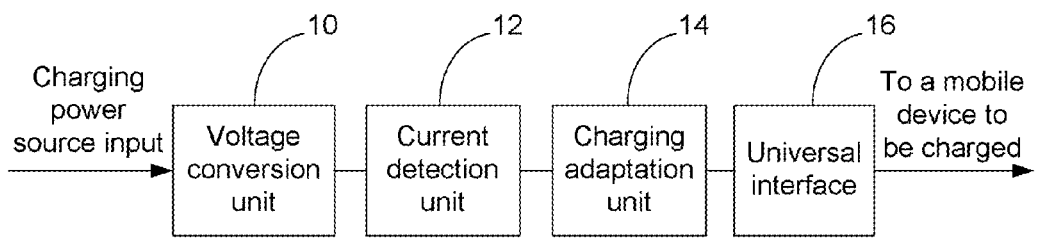
FIG. 1 shows a structural diagram of a charging circuit of an embodiment of the present disclosure.

FIG. 1 shows a structural diagram of a charging circuit of an embodiment of the present disclosure.

As shown in FIG. 1, the charging circuit includes: a universal interface 16 connected to a mobile device to be charged; a charging adaptation unit 14 including at least two types of charging circuits (not shown in the figure), wherein the charging adaptation unit 14 is connected to the universal interface 16 and configured to provide the corresponding charging circuit for the mobile device; a voltage conversion unit 10 connected to a charging power source (not shown in the figure) and configured to adjust the output voltage of the charging power source to a charging voltage for the mobile device; a current detection unit 12 connected between the voltage conversion unit 10 and the charging adaptation unit 14 and configured to detect a charging current, wherein the charging current is configured to determine the charging circuit corresponding to the mobile device.

Through the above technical solution of the embodiment, different adaptation circuits may be designed through a single universal interface 16 to satisfy charging demands of various brands of mobile devices. For a user, various mobile devices can be charged with one charger, thus improving user experience.

Specifically, the voltage conversion unit 10 may apply a chip which is a Direct Current-to-Direct Current (DC-to-DC) converter to increase a battery voltage to a standard voltage of 5V required by a charging circuit, provide a maximum current output of 2 A and realize an efficiency of 80% in the case that the output voltage is 5V and the current is 2 A. The current detection unit 12 may be composed of a resistor and a chip, wherein the resistor may be a Sense resistor of 30 milliohms and the chip may be an operational amplifier having an amplification factor of 25. The voltage difference of two ends of the resistor is detected by the chip and a current flowing through the resistor can be calculated by the resistance value of the resistor. The current is a very important parameter to select a charging adaptation circuit and a mark to end a charging process.

Figure 2:
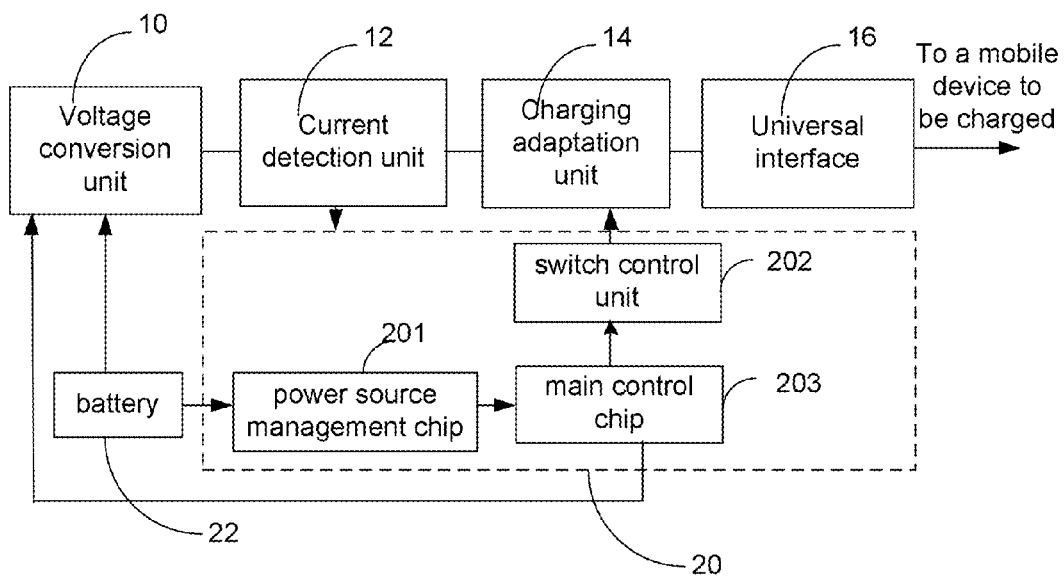
FIG. 2 shows a structural diagram of a charging circuit of another embodiment of the present disclosure.

FIG. 2 shows a structural diagram of a charging circuit of another embodiment of the present disclosure.

As shown in FIG. 2, the charging circuit further includes a control unit 20; the control unit 20 is connected to the current detection unit 12, the charging adaptation unit 14 and the voltage conversion unit 10 respectively, and configured to determine whether charging of the mobile device is completed according to a current value detected by the current detection unit 12, so as to control the charging adaptation unit 14 and the voltage conversion unit 12 to turn on and turn off. More specifically, the control unit 20 includes: a power source management chip 201, connected to the charging power source 22 and the current detection unit 12 respectively and configured to acquire the current value and acquire a power supply voltage provided by the charging power source for the control unit 20; a main control chip 203, connected to the power source management chip 201 and the voltage conversion unit 10 and configured to send a control instruction according to the current value and control the voltage conversion unit 10 to turn on and turn off; a switch control unit 202, connected to the main control chip 203 and the charging adaptation unit 14 respectively and configured to send a control instruction according to the current value and control the charging adaptation unit 14 to turn on and turn off.

Through the above technical solution of the embodiment, in the case that the electric quantity of a mobile device is adequate, another mobile device can be charged and the mobile devices are not limited to the same brand. At the same time, the charging circuit of the embodiment further provides a control unit 20. The control unit can control a charging adaptation unit 14 and a voltage conversion unit 10 according to indication of a current detection unit 12 so that automatic power-off can be realized in the case that charging is completed to avoid waste of electric quantity.

Preferably, the universal interface is a USB interface.

A USB interface is a universal interface used most commonly in the field and can be applied most widely by various brands of mobile terminals. However, the universal interface is not limited to a USB interface; other universal interfaces are also applicable in the present disclosure.

Figure 3:
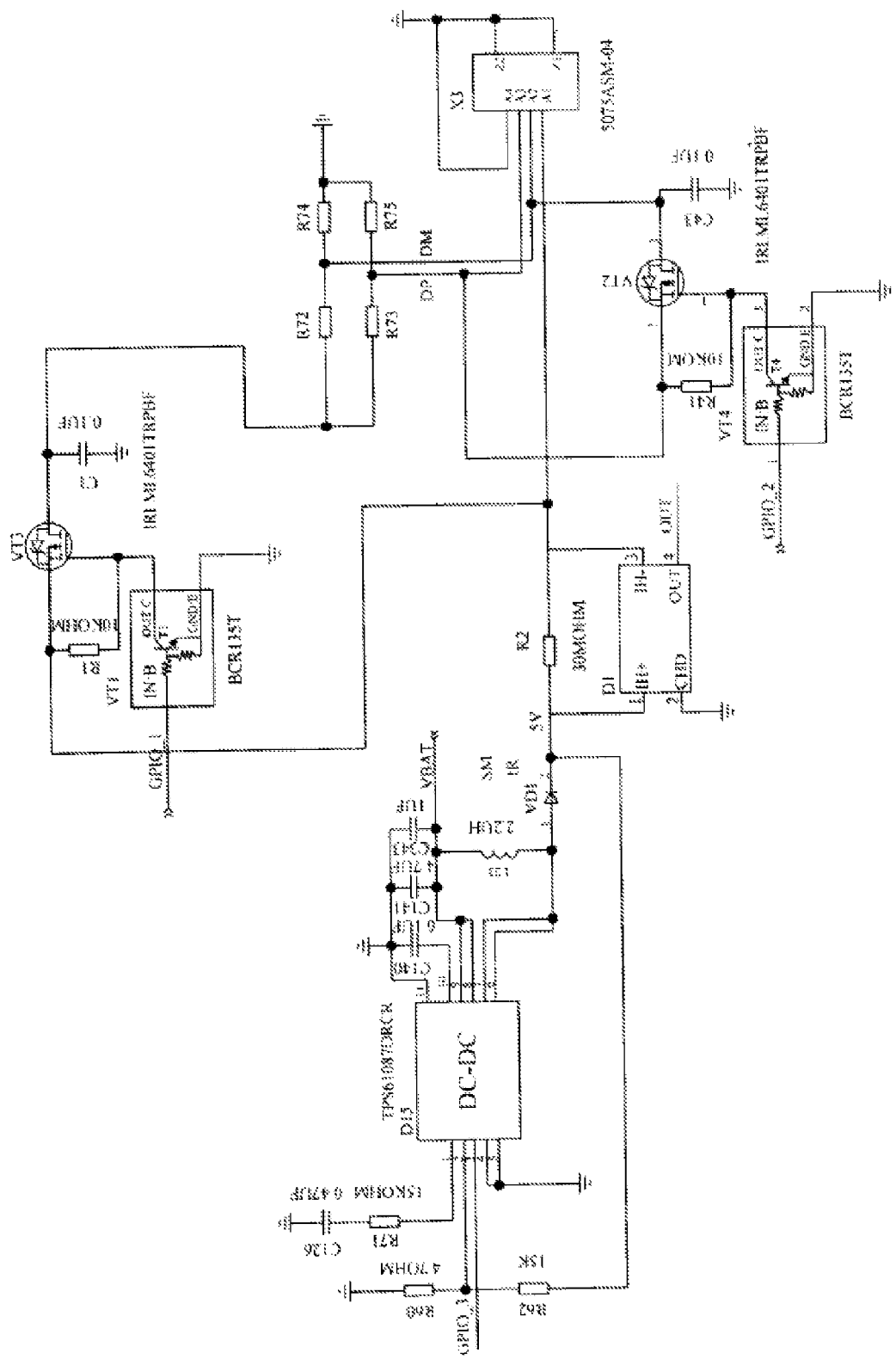
FIG. 3 shows a specific structural diagram of a charging circuit of an embodiment of the present disclosure.

FIG. 3 shows a specific structural diagram of a charging circuit of an embodiment of the present disclosure.

As shown in FIG. 3, D15 is a DC-DC configured to increase a battery voltage to a standard voltage of 5V required by a charging circuit, provide a maximum current output of 2 A and realize an efficiency of 80% in the case that the output voltage is 5V and the current is 2 A. VBAT (battery voltage) is the battery input end. R2 and D1 form a current detection circuit. R2 is a Sense resistor of 30 milliohms. D1 is an operational amplifier having an amplification factor of 25. D1 detects the voltage difference of two ends of R2 while a current flowing through R2 can be calculated by the resistance value of R2. The current is a very important parameter to select a charging adaptation circuit and a mark to end a charging process. Transistor VT1, Metal-Oxide-Semiconductor (MOS) transistors VT3 and VT2, and transistor VT4 form a switch control unit. The collector of VT1 controls the gate of VT3 so as to control VT3 to be on or off. VT2 and VT4 are also controlled in a similar way. R72, R73, R74 and R75 form a voltage division circuit to divide 5V into 2.6V and 1.8 v to supply to the DP and DM pins. VT1 and VT3 output 5V to the voltage division circuit R72-R75 while VT2 and VT3 control DP and DM to connect.

The above technical solution of the embodiment provides an embodiment of a charging circuit of the present disclosure. It can be learned from the circuit that the charging circuit provided by the present disclosure is simple in design and uses the same charging interface to complete intelligent identification, thus facilitating usage for users.

Figure 4:
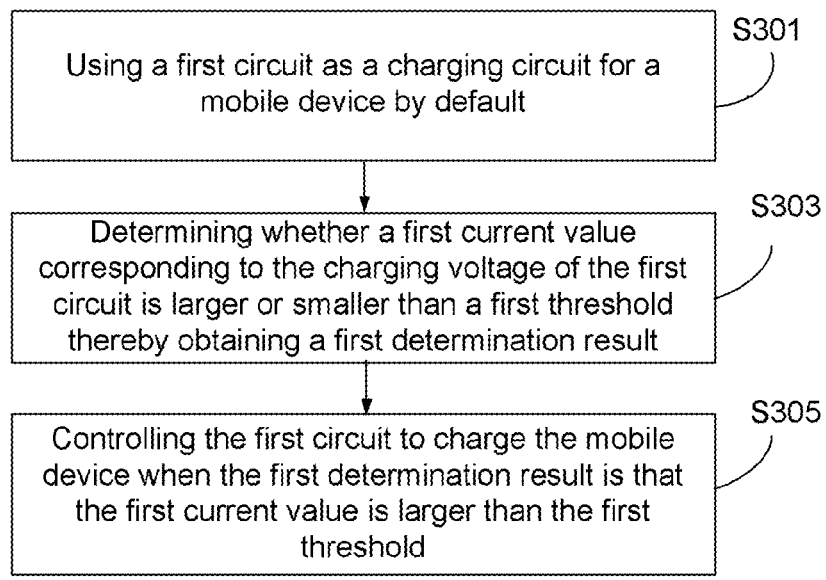
FIG. 4 shows a flowchart of a control method of a charging circuit of an embodiment of the present disclosure.

FIG. 4 shows a flowchart of a control method of a charging circuit of an embodiment of the present disclosure.

As shown in FIG. 4, the control method of the charging circuit includes:

Step 301: using a first circuit as a charging circuit for a mobile device by default;

Step 303: determining whether a first current value corresponding to the charging voltage of the first circuit is larger than a first threshold and obtaining a first determination result;

Step 305: controlling the first circuit to charge the mobile device when the first determination result is that the first current value is larger than the first threshold.

Through the above technical solution of the embodiment, a charging circuit corresponding to a mobile device is selected through a current value of a circuit to perform charging, thus solving the problem that different brands of mobile devices cannot use the same charging device.

In the embodiment, application scenarios are related closely to specific circuit implementation solutions thereof. At least two charging circuits are provided. These two circuits have different characteristics. The voltages on two data pins of a first circuit are the same, e.g. non-PHONE4 circuits, and the voltages on two data pins of a second circuit are different, e.g. IPHONE4 circuits.

Figure 5:
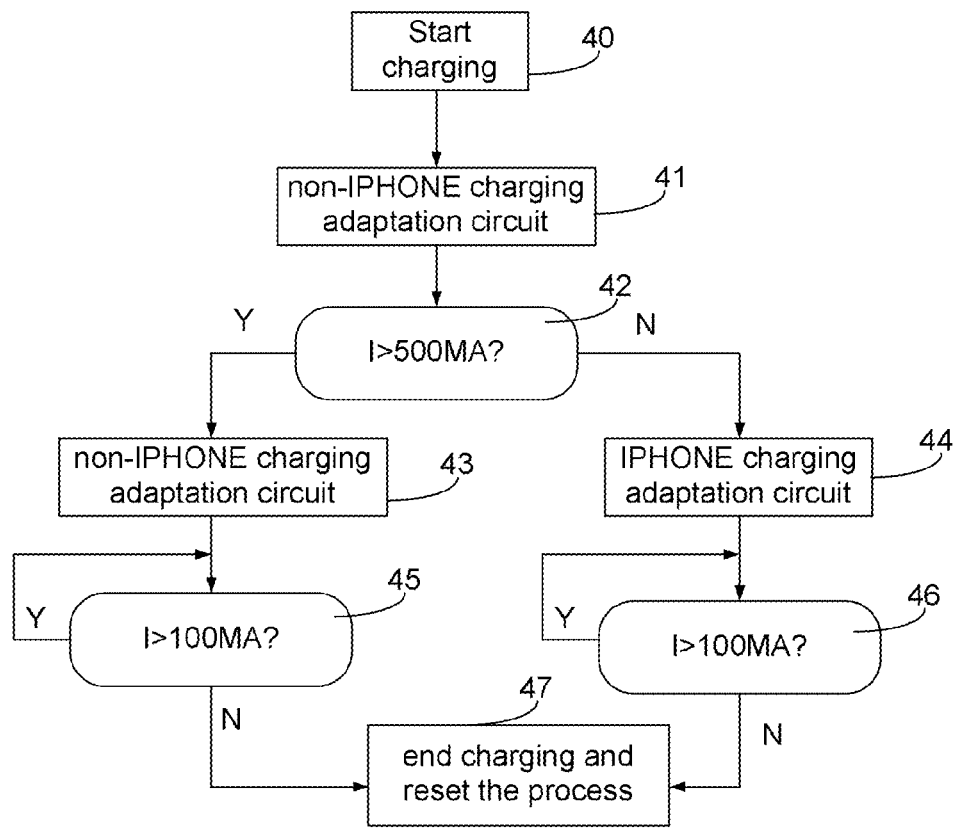
FIG. 5 shows a flowchart of control method of a charging circuit of another embodiment of the present disclosure.

First, a main control chip enables a DC-DC so that the DC-DC outputs a power source with a voltage of 5V and a maximum current of 2 A. The second circuit starts to charge only when detecting 2.6V and 1.8V on DP and DM while the first circuit starts to charge when applying a voltage value on DP to also detect the voltage value on DM. If the voltage value is not detected on DM, it needs to select the first circuit as a charging adaptation circuit. At the moment, a charging circuit corresponding to the first circuit is connected while a charging circuit corresponding to the second circuit is disconnected. FIG. 5 shows a flowchart of a control method of a charging circuit of another embodiment of the present disclosure.

As shown in FIG. 5, a first circuit and a second circuit are still taken for example, wherein the characteristic of the first circuit is that the voltages on two data pins are the same and the characteristic of the second circuit is that the voltages on two data pins are different. The control method of the charging circuit includes the following steps:

Step 40: start charging;

Step 41: use the current second circuit as a charging adaptation circuit by default;

Step 42: detect whether a current value corresponding to the current charging voltage is larger than a first threshold 500 mA; if yes, perform Step 43; otherwise, perform Step 44;

Step 43: select the second circuit as a charging adaptation circuit to charge;

Step 44: select the first circuit as the charging adaptation circuit to charge;

Step 45: detect whether a current value of the second circuit as a charging adaptation circuit is larger than a second threshold; if yes, perform charging and return to Step 45; otherwise, perform Step 47;

Step 46: detect whether a current value of the first circuit as a charging adaptation circuit is larger than a second threshold; if yes, perform charging and return to Step 46; otherwise, perform Step 47;

Step 47: end charging and reset the process.

Through the above technical scheme of the embodiment, the control method of the charging circuit provided by the present disclosure can not only charge different brands of mobile devices, but also control related operations automatically after charging is completed, thus improving user experience for users.

Specifically, a current detection circuit detects a current. If the current is larger than 500 mA, it is indicated that the second circuit charges a mobile device and a charging adaptation circuit remains unchanged, and current detection enters a detection process of the next two levels to detect whether the current is larger than 100 mA in real time. If the current is larger than 100 mA, charging is performed continuously. Otherwise, charging is stopped and the process is reset to wait for the next charging process.

If the current is smaller than 500 mA, it is indicated that an IPHONE4 or IPAD2 mobile device is accessed, and the charging adaptation circuit is switched to the first circuit type charging adaptation circuit. The charging circuit is adapted successfully, and current detection enters a detection process of the next two levels to detect whether the current is larger than 100 mA in real time. If the current is larger than 100 mA, charging is performed continuously. Otherwise, charging is stopped and the process is reset to wait for the next charging process.

The reason to select the second circuit as an initial charging adaptation circuit is that if the first circuit type charging adaptation circuit is used, 2.6V and 1.8V are applied on DP and DM, and if a second circuit type mobile device is accessed, the device may be damaged. However, if the second circuit type charging adaptation circuit is used to start detection, a first circuit type mobile device will not be damaged even if inserted and will not be charged at most.

It can be found from the above embodiments that a charging circuit and a control method thereof provided by the present disclosure have advantages of simple circuit design, small volume and stable functions etc. In addition, a product having a large capacity battery can charge other kinds of mobile devices with only one USB interface, thus expanding application of products with large capacity batteries. A single charging interface is used to realize intelligent identification, thus improving user experience for users.

The above are only preferred embodiments of the present disclosure and should not be used to limit the protection scope of the present disclosure.

The invention claimed is:

1. A charging circuit, the charging circuit including:
   a universal interface connected to a mobile device to be charged;
   a charging adaptation unit including at least two types of charging circuitries, wherein the charging adaptation unit is connected to the universal interface and configured to provide a corresponding charging circuitry for the mobile device;
   a voltage conversion unit connected to a charging power source and configured to adjust an output voltage of the charging power source to a charging voltage for the mobile device; and
   a current detection unit connected between the voltage conversion unit and the charging adaptation unit and configured to detect a charging current, wherein the detected charging current is configured to determine the corresponding charging circuitry for the mobile device.

2. The charging circuit according to claim 1, wherein the at least two types of charging circuitries include a first circuit and a second circuit, wherein the first circuit is a charging circuitry having a same voltage on two data pins, and the second circuit is a charging circuitry having different voltages on two data pins.

3. The charging circuit according to claim 2, wherein the charging circuit further includes:
 a control unit, connected to the current detection unit, the charging adaptation unit and the voltage conversion unit respectively and configured to determine, according to a current value detected by the current detection unit, whether charging of the mobile device is completed, and control the charging adaptation unit and the voltage conversion unit to turn on and turn off.

4. The charging circuit according to claim 3, wherein the control unit includes:
 a power source management chip, connected to the charging power source and the current detection unit respectively and configured to acquire the current value and acquire a power supply voltage provided by the charging power source for the control unit;
 a main control chip, connected to the power source management chip and the voltage conversion unit and configured to send a control instruction according to the current value and control the voltage conversion unit to turn on and turn off; and
 a switch control unit, connected to the main control chip and the charging adaptation unit respectively and configured to send a control instruction according to the current value and control the charging adaptation unit to turn on and turn off.

5. The charging circuit according to claim 1, wherein the charging circuit further includes:
 a control unit, connected to the current detection unit, the charging adaptation unit and the voltage conversion unit respectively and configured to determine, according to a current value detected by the current detection unit, whether charging of the mobile device is completed, and control the charging adaptation unit and the voltage conversion unit to turn on and turn off.

6. The charging circuit according to claim 5, wherein the control unit includes:
 a power source management chip, connected to the charging power source and the current detection unit respectively and configured to acquire the current value and acquire a power supply voltage provided by the charging power source for the control unit;
 a main control chip, connected to the power source management chip and the voltage conversion unit and configured to send a control instruction according to the current value and control the voltage conversion unit to turn on and turn off; and
 a switch control unit, connected to the main control chip and the charging adaptation unit respectively and configured to send a control instruction according to the current value and control the charging adaptation unit to turn on and turn off.

7. The charging circuit according to claim 1, wherein the universal interface is a Universal Serial Bus (USB) interface.

8. A control method of a charging circuit, the control method including:
 using, by a charging adaptation unit, a first circuit as a charging circuitry for a mobile device by default;
 determining, by the charging adaptation unit, whether a first current value corresponding to a charging voltage of the first circuit is larger or smaller than a first threshold thereby obtaining a first determination result; and
 controlling, by the charging adaptation unit, the first circuit to charge the mobile device when the first determination result is that the first current value is larger than the first threshold.

9. The control method according to claim 8, wherein after the step of controlling the first circuit to charge the mobile device, the method further comprises:
 determining whether a second current value corresponding to the charging voltage of the first circuit is larger or smaller than a second threshold thereby obtaining a second determination result;
 controlling the first circuit to continue to charge the mobile device when the second determination result is that the second current value is larger than the second threshold, and controlling the first circuit to stop charging the mobile device when the determination result is that the second current value is smaller than the second threshold.

10. The control method according to claim 9, wherein voltages on two data pins of the first circuit are the same.

11. The control method according to claim 10, wherein when the first determination result is that the first current value is smaller than or equal to the first threshold, the method further includes:
 determining a second circuit to be a charging circuitry according to the first current value; and
 controlling the second circuit to charge the mobile device.

12. The control method according to claim 11, wherein voltages on two data pins of the second circuit are different.

13. The control method according to claim 8, wherein voltages on two data pins of the first circuit are the same.

14. The control method according to claim 13, wherein when the first determination result is that the first current value is smaller than or equal to the first threshold, the method further includes:
 determining a second circuit to be a charging circuitry according to the first current value; and
 controlling the second circuit to charge the mobile device.

15. The control method according to claim 14, wherein voltages on two data pins of the second circuit are different.

* * * * *